United States Patent [19]

Dahlgren, Jr. et al.

[11] Patent Number: 4,561,814

[45] Date of Patent: Dec. 31, 1985

[54] MECHANICAL TOOL MANIPULATING METHOD AND APPARATUS

[76] Inventors: William V. Dahlgren, Jr., 240 Dolores, Apt. 138, San Francisco, Calif. 94103; Edward W. Claire, 5332 Shafter Ave., Oakland, Calif. 94618

[21] Appl. No.: 281,602

[22] Filed: Jul. 9, 1981

[51] Int. Cl.$^4$ .............................. B23C 1/06; B23Q 1/26
[52] U.S. Cl. ..................................... 409/80; 308/6 R; 408/67; 408/78; 408/130; 409/137; 409/146; 409/189; 409/202; 409/903
[58] Field of Search ................. 409/146, 80, 137, 164, 409/184, 186, 189, 197, 202, 220, 225, 226, 235, 903; 308/6 C, 6 R; 144/253 F; 408/112, 3, 67, 78, 109, 130

[56] References Cited

U.S. PATENT DOCUMENTS

| | | | |
|---|---|---|---|
| 458,325 | 8/1891 | Gifford | 409/146 |
| 481,983 | 9/1892 | Thom | 144/253 F |
| 2,139,234 | 12/1938 | Johnson | 308/6 R |
| 2,865,236 | 12/1958 | Parke | 408/112 X |
| 3,783,741 | 1/1974 | Schadebrodt et al. | 409/80 |

OTHER PUBLICATIONS

"Computer Controlled Engraving", The Engravers Journal, Jul./Aug. 1980, pp. 12, 14, 44–49.

*Primary Examiner*—Z. R. Bilinsky
*Attorney, Agent, or Firm*—Limbach, Limbach & Sutton

[57] ABSTRACT

A mechanical tool manipulating method and apparatus including apparatus and process for splitting axes of drive, wherein the drive means include preloaded lead screw nuts for minimal backlash, and "v" wheels and cylindrical slides for lineal tracking, as well as apparatus and process for precision clamping of the workpiece, and for recirculating exhaust air for clearing debris.

14 Claims, 7 Drawing Figures

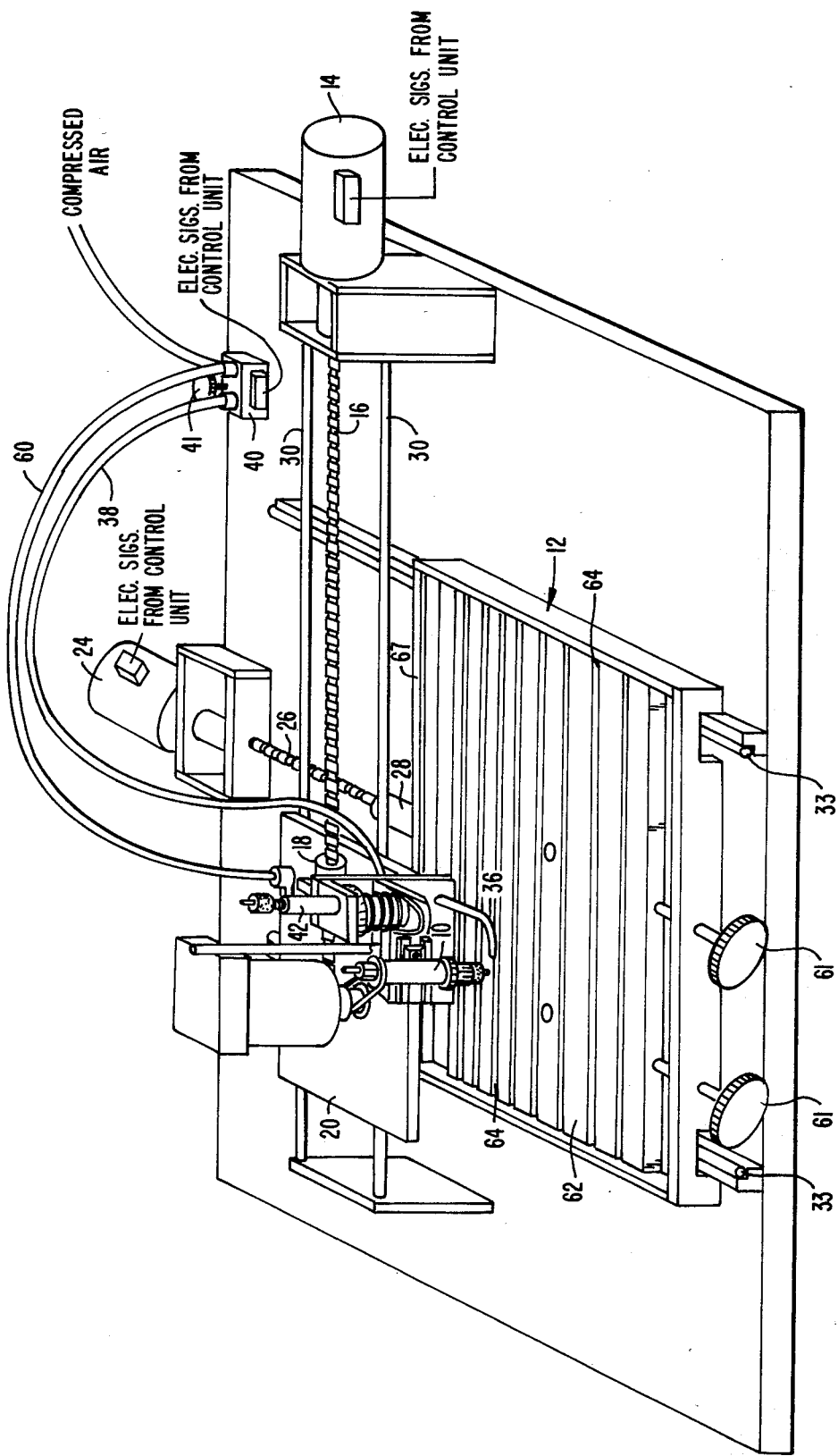
FIG._1.

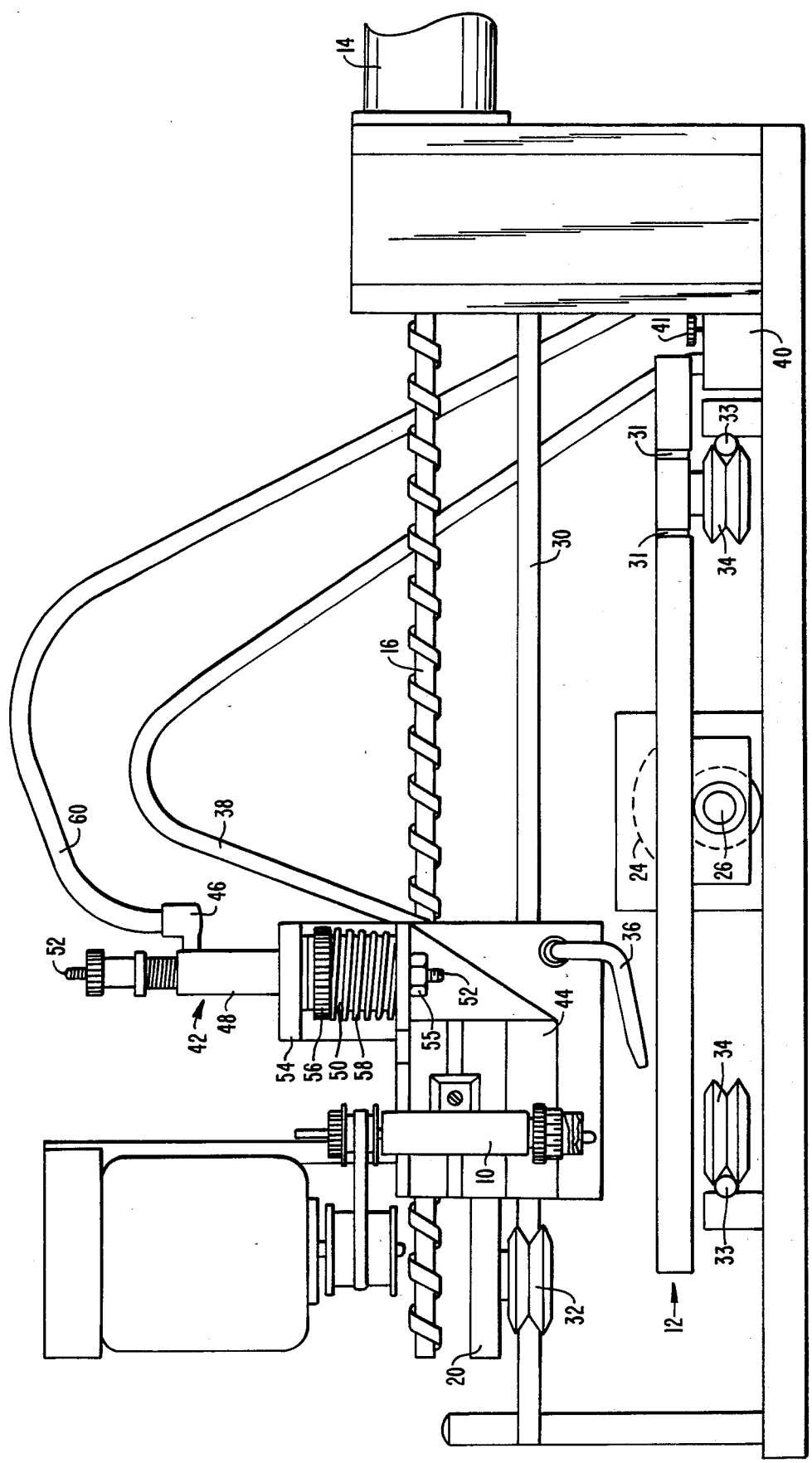
FIG._2.

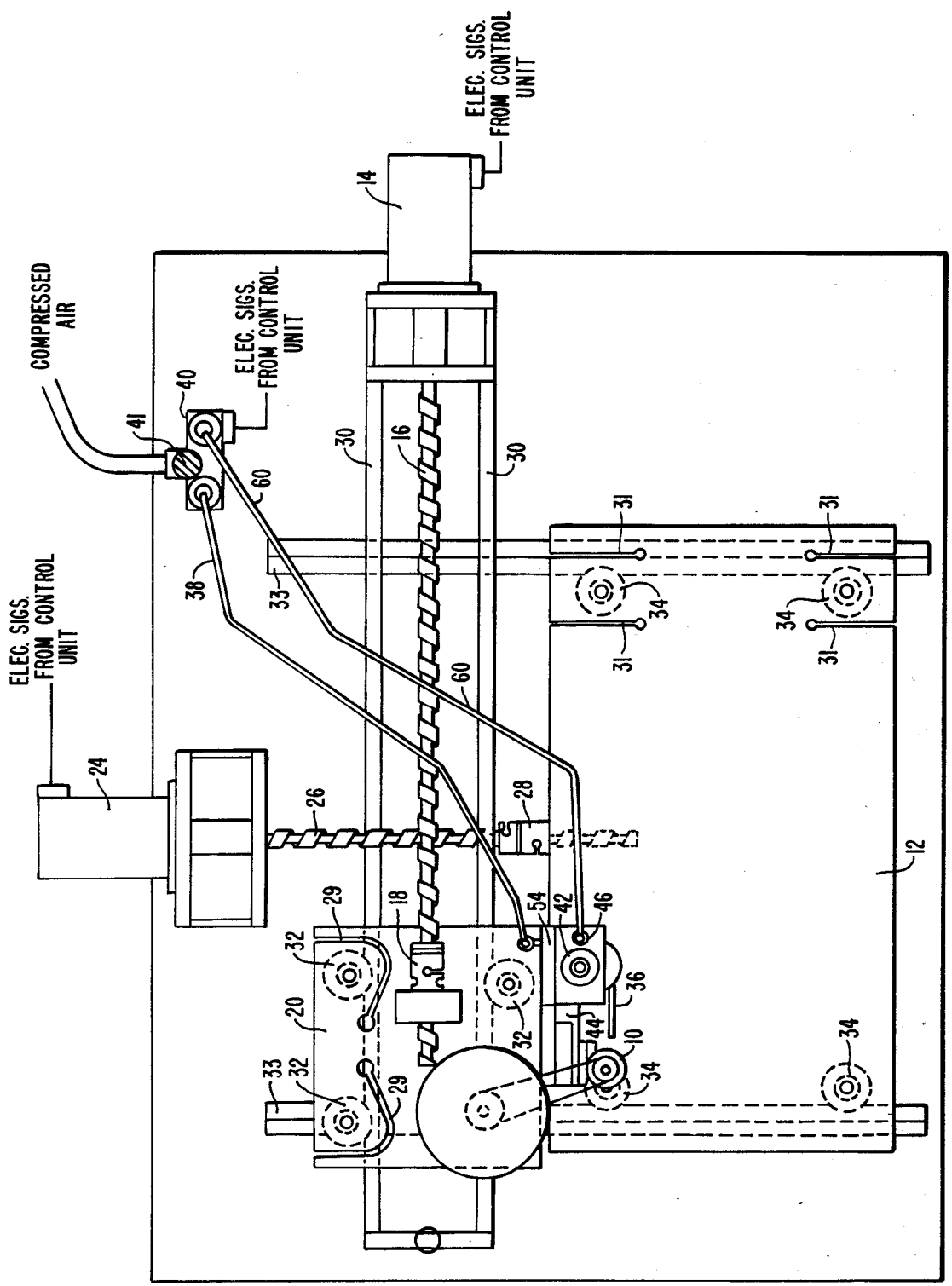
FIG._3.

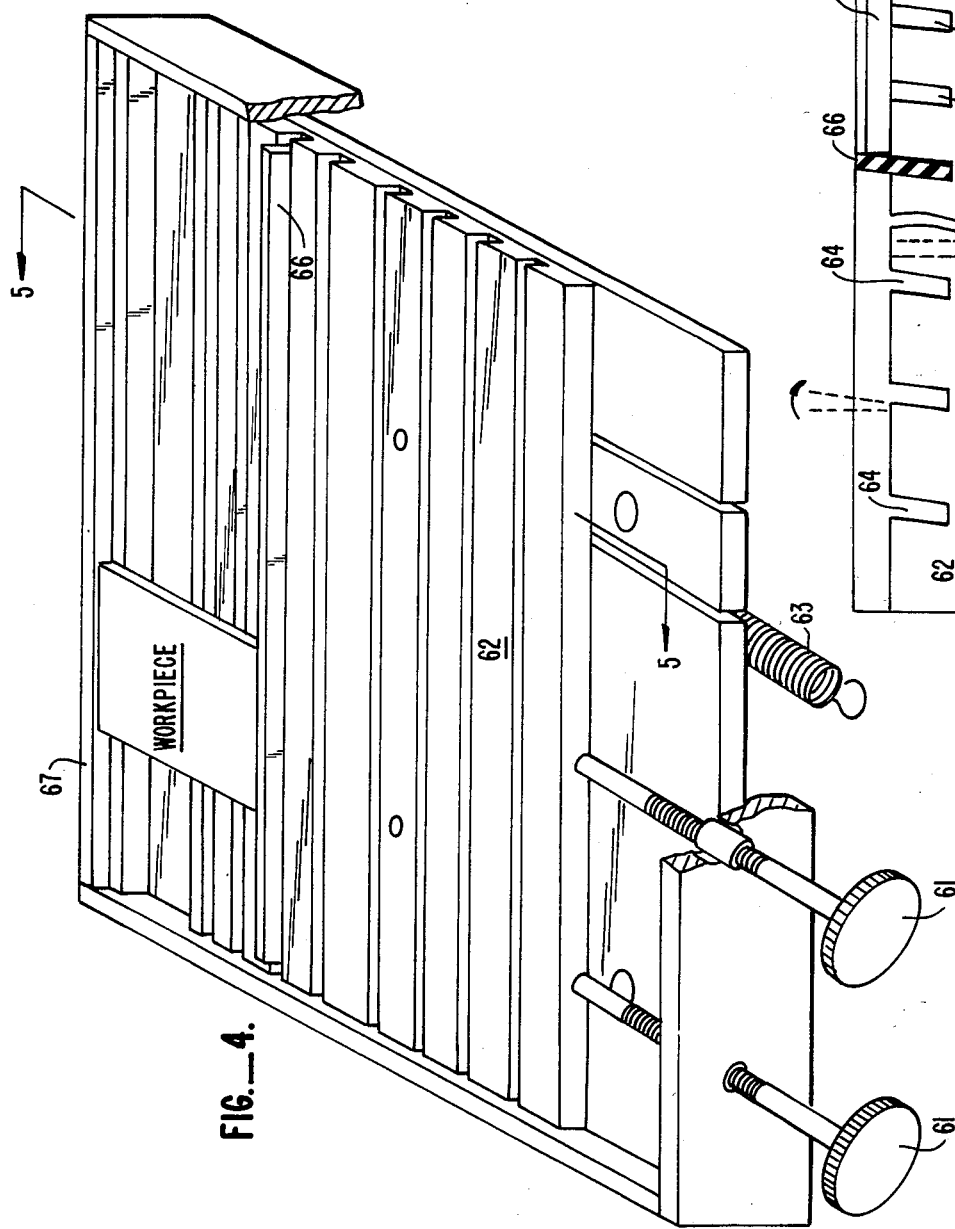
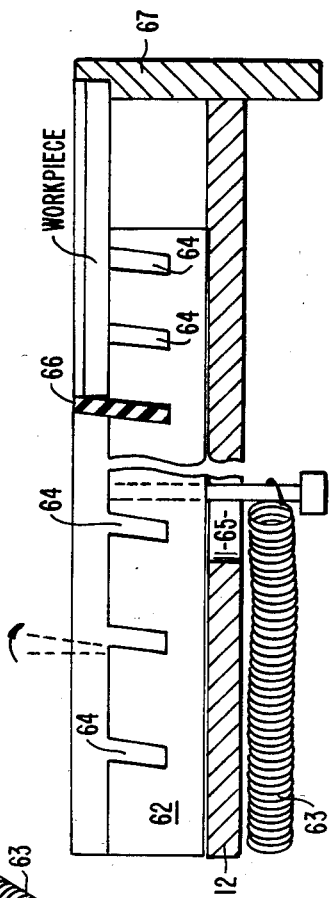
FIG._4.
FIG._5.

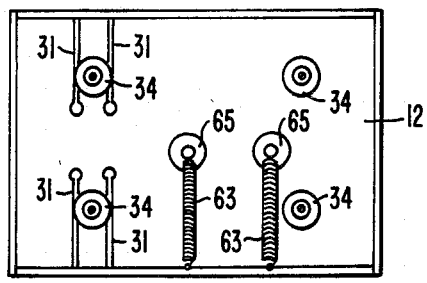
FIG._6.
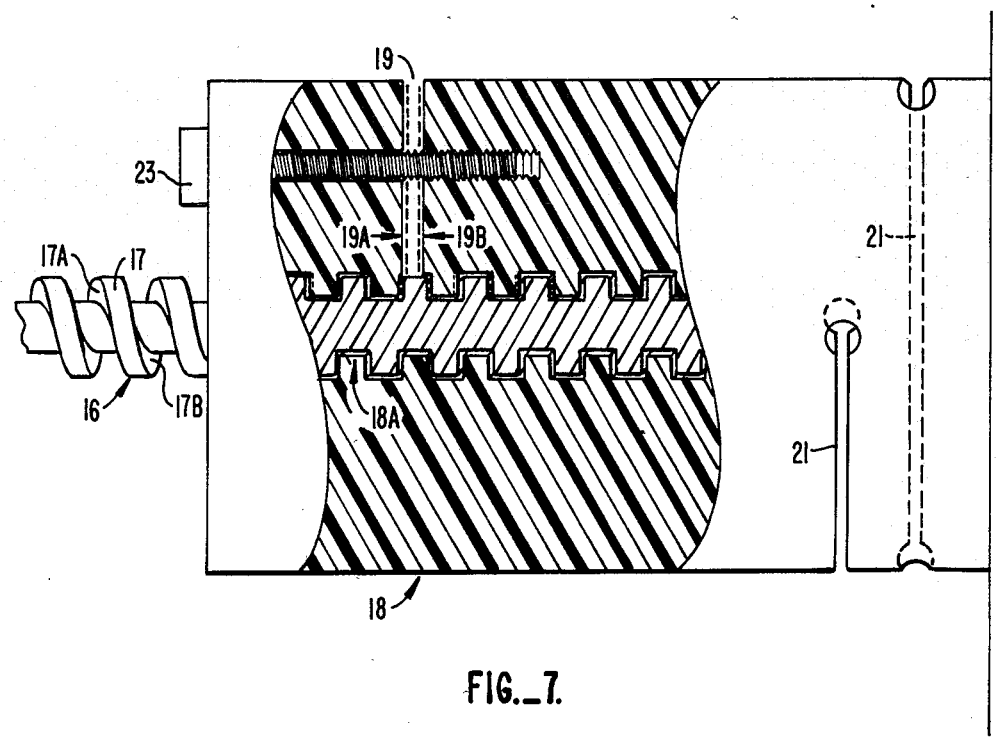
FIG._7.

MECHANICAL TOOL MANIPULATING METHOD AND APPARATUS

BACKGROUND OF THE INVENTION

Reference is made to two previously-filed patent applications entitled Tool Manipulating Method and Apparatus Ser. No. 257,581, filed Apr. 27, 1981, and Tool Manipulating Method and Apparatus For Multiple Job Processing, Ser. No. 257,559, filed April 27, 1981.

The present invention is directed generally to tool control and, particularly, to a mechanical tool manipulating method and apparatus.

As described in the referenced applications, in the engraving art engraving tools have long been manipulated by hand, either freehand or by the use of a tracing apparatus, such as a pantograph. The engraving tool manipulating method and apparatus as described in the referenced applications make great strides in simplifying the engraving process, in increasing the productivity of an engraver, and in reducing the problems attendant manually controlled engraving. The mechanical tool manipulating method and apparatus of the present invention find application as one implementation of the mechanical tool manipulating means described in the referenced patent applications.

SUMMARY OF THE INVENTION

The present invention of a method and apparatus of the type used in computer controlled tool manipulating systems, wherein a tool is controlled with respect to a work piece which, in turn, is supported by a table, comprises first positioning means for moving the tool along a first axis, second positioning means for moving the table along a second axis, and means for providing lineal tracking of the tool and the table.

Means are also provided which preload the first and second positioning means so that minimal backlash in the movement of the tool and the table is obtained. Additionally, the present invention provides means for air-activated control of the position of the tool with respect to the work piece, as well as means for precision clamping of the work piece to the table.

It is, therefore, an object of the present invention to provide a mechanical tool manipulating apparatus and method having lineal tracking.

It is a further object of the present invention to provide a mechanical tool manipulating apparatus wherein the movement of the table and the tool have minimal backlash.

It is a still further object of the present invention to provide a mechanical tool manipulating apparatus wherein the tool elevation with respect to the work piece is controlled by air-activated means.

It is another object of the present invention to provide a mechanical tool manipulating apparatus which automatically directs a stream of air onto the work piece to clear debris each time the tool is raised out of contact with the work piece.

It is still another object of the present invention to provide a mechanical tool manipulating apparatus having a clamp for the precision clamping of the work piece to the table.

The foregoing and other objects, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a perspective view of the present invention.
FIG. 2 is a frontal view of the present invention.
FIG. 3 is a top view of the present invention.
FIG. 4 is a perspective view of the table and precision clamp of the present invention.
FIG. 5 is a cross-sectional view of the table and clamp taken along Lines 5—5 of FIG. 4.
FIG. 6 is a bottom view of the table.
FIG. 7 is a perspective view of a preloaded lead screw nut.

DETAILED DESCRIPTION OF THE PREFERRED EMBODIMENT OF THE PRESENT INVENTION

Referring to FIG. 1, the mechanical tool manipulating apparatus of the present invention will now be described in greater detail.

Generally, the present invention includes a tool 10, such as an engraving device; a table 12; first positioning means for moving the engraving device 10 along a first axis; second positioning means for moving the table along a second axis; and means for providing lineal tracking of the tool and table. In the present invention, the first and the second positioning means include a stepper motor and lead screw combination. Each stepper motor receives electronic signals from electronic control circuitry, for example, the control unit in the referenced applications. The stepper motor translates those signals into rotational motion. This rotational motion is transferred to a lead screw. The rotation of the lead screw causes the table or tool to be moved along the lead screw axis, using, for example, a lead screw nut.

The method and apparatus of the present invention find application in the manipulating of many types of tools, such as those used for milling, welding, burning or etching. However, for purposes of illustration, the present invention will be described in the context of manipulating an engraving tool to engrave a workpiece. It is not intended by specific reference to the engraving arts to limit the scope of application of the present invention thereto.

In FIG. 1, stepper motor 14 receives X-axis signals from the control portion of the system, and causes lead screw 16 to rotate accordingly. Lead screw nut 18, which is mounted to lead screw 16, is moved back and forth along the axis of lead screw 16 as the lead screw rotates. Lead screw nut 18 is mounted to carriage 20. The rotation of lead screw 16 causes lead screw nut 18 to be moved which, in turn, causes carriage 20 to be moved along the lead screw 16 axis.

Engraving device 10 is connected to the carriage 20 through a moveable bracket 44 which is positionable in a vertical plane. Engraving tool 10 is thereby moved along the axis of lead screw 16 in accordance with X-axis signals and raised or lowered with respect to the workpiece in response to tool control signals supplied from the control portion of the system.

Stepper motor 24 receives Y-axis signals from the control portion of the system. In response to the signals, stepper motor 24 rotates lead screw 26. The axis of lead screw 26 is chosen to be orthogonal to the axis of lead screw 16. Lead screw 26 is connected to lead screw nut 28. Lead screw nut 28, in turn, is connected to the table 12. The rotation of lead screw 26 thereby causes lead screw nut 28 to be moved along lead screw 26 which, in turn, causes the table 12 to be moved along the axis of lead screw 26.

As such, by supplying appropriate signals to the X stepper motor 14, and the Y stepper motor 24, the tool 10 and the table 12 can be moved with respect to each other in any desired two-dimensional pattern.

One advantage of configuring the apparatus in a two-axis system, i.e. splitting the axes of drive, is that the mass which is required to be moved by any one stepper motor is greatly reduced. In turn, the momentum which must be overcome or dissipated in starting or stopping, is smaller. This translates to more precise control of the position of the tool 10 with respect to the table 12.

In order to obtain precision positioning of the tool 10 with respect to the table 12, additional steps should be taken to overcome such factors as backlash associated with the imperfect mating of the lead screws and lead screw nuts; non-lineal tracking of the tool and the table along their respective axes; tool elevation and contact pressure with respect to the work piece; and problems associated with the securing of the work piece to the table 12.

In the present invention, lineal tracking of the table 12 and the tool 10 is provided through the use of "v" wheels which roll along slides having cylindrical cross-sections. In FIG. 1, the slides or rods 30 which are used in the lineal tracking of the carriage 20 can be seen. Likewise, the slides or rods 33 used in the lineal tracking of the table 12 can also be seen. These rods are positioned parallel to the axis of the corresponding lead screw. For example, rods 30 are positioned along the axis of leads screw 16.

FIG. 2 illustrates the positioning of the "v" wheels with respect to the rods and the table 12 and the carriage 20. In FIG. 2, the table 12 is shown without the associated clamping mechanism and edge pieces so that the "v" wheel positions can be observed. "V" wheels 34 are mounted to table 12 so that the wheels will roll along rods 33. Likewise, wheels 36 are mounted to carriage 20 so that the wheels will roll along rods 30. In this manner, as carriage 20 is moved along the axis of lead screw 16 by the action of the lead screw upon lead screw nut 18, rods 30 and "v" wheels 32 guide the carriage in a lineal fashion, maintaining the carriage within the same horizontal plane over the full range of x axis movement. Likewise, "v" wheels 34 and rods 33 maintain table 12 within the same horizontal plane as the table is moved back and forth by lead screw 26 and lead screw nut 28.

The combination of the "v" wheels 32 and 34, and rods 30 and 33 minimize the amount of vertical play between the wheels and the rods, while preventing any debris which may accumulate along the rods, from interferring with the tracking properties of the combination.

The former property arises from the "v" shape of the contact surfaces of the wheels which, when used in conjunction with a cylindrically cross-sectioned slide, distribute the contact forces between the slide and the wheel so that any forces which lie in a direction parallel to the plane of rotation of the wheel will tend to urge the contact point between the slide and the wheel toward the interior of the "v" and into contact with the other surface of the "v". When the contact points between the slide and the wheel are located on both surfaces of the "v", any additional horizontal forces will tend to keep the slide in contact with both surfaces of the "v".

In the present invention, a horizontal force is supplied by preloading the "v" wheels so that for each wheel the slide is maintained in contact with both "v" contact surfaces and over the full range of table 12 or carriage 20 movement.

The latter property above was not available when V-shaped rods were used in conjunction with the "V" shaped wheels. In such case debris would often lodge between the slide and wheel and prevent any movement of the "v" wheel along the "v" shaped slide. When cylindrical cross-sectioned rods are used, any debris falling upon the rods will be pushed aside, rather than becoming lodged between the rod and the wheel.

In order to ensure minimum play between the "v" wheels and the rod slides, preloading, as mentioned above, of several of the "v" wheels on the carriage 20 and the table 12 are provided. Referring to FIG. 3, the preloading of the "v" wheels on the carriage 20 can be seen. In order to implement such preloading, a kerf is cut into the carriage 20 so that each "v" wheel is connected to the carriage by a finger of material. In FIG. 3, it can be seen that a curved kerf 29 is cut into the carriage 20 and around the "v" wheels 32. In so doing, the elasticity of the carriage material is utilized to provide a small amount of counter force when the "v" wheels are made to contact with the rods 30. The "v" wheels are positioned on the carriage 20 so that when they are positioned against the rods 30, there is a slight outward displacement of each finger. This displacement can be viewed as an inward force on the "v" wheels supplied by the finger elasticity which keeps the "v" wheels in contact with the rods despite variations in the straightness of the rods.

The preloading of the "v" wheels of the table 12 is accomplished in a similar manner, as can be seen in FIG. 3, slots 31 are cut in the table 12 material so that a finger is formed around two of the "v" wheels 34. The rods are positioned so that there is a slight inward displacement of each finger. In this manner, the elasticity of the table material is utilized to provide a small counter force which, in turn, keeps the "v" wheels in contact with the rod slides 33.

In connection with the movement of the table 12 and the carriage 20 by their corresponding lead screws, means should be provided which prevent backlash of the table or carriage once rotation of the lead screw has ended. This backlash is a function of the coupling between the lead screw and the lead screw nut. For example, gaps may exist between the threads 18A of the lead screw nut and the threads 17 of the lead screw. A less than perfect mating between the nut and screw results in an additional shift in position when the table or carriage is being moved in any particular direction. The momentum which must be counteracted when stopping the movement of the carriage 20 or table 12, or that which must be supplied when initiating movement of the same, causes this position shift. In the former case, when the rotation of the lead screw ends, the table 12 or carriage 20 will continue to move until the teeth of the lead screw nut shift from one side of the groves of the lead screw to the other side.

If this additional shift in position, or backlash, is not eliminated, the position of the carriage 20 or table 12 will be offset from the desired position.

In order to counteract this backlash effect, lead screw nuts 18 and 28 are preloaded to compensate for gaps between the threads 17 of the lead screw and the thread 18A of the lead screw nut.

Referring to FIG. 7, a cut-away preloaded lead screw nut is shown. Preloading is obtained in the following manner. First, slots are cut in the lead screw nut body, with a preloading slot 19 being positioned toward one end of the lead screw nut and a pair of articulation slots 21 being positioned toward the opposite end of the lead screw nut.

The lead screw nut is compressed across the preloading slot, using, for example, a screw 23. The screw is adjusted to provide a predetermined amount of compression as illustrated by dotted lines 19A and 19B. This in turn causes the threads of the nut to move toward preloading slot 19, which in turn causes the group of threads represented by dotted line 19A to move toward once face 17A of the lead screw threads represented by dotted line 19B to move toward the opposite face 17B of the lead screw threads 17. The combination of these movements acts to narrow the effective gap between the lead screw nut threads 18A and the lead screw threads 17. Each of the articulation slots 21 are positioned in adjacent parallel, hypothetical planes. One slot of the pair 21 is formed in the lead screw nut 18 so that it is oriented at approximately right angles to the other slot of the pair 21. For example, if both slots were positioned in the same plane, one slot would occupy the first and second quadrants of the plane while the other slot would occupy the second and third quadrants. In other words, each slot 21 of the pair is positioned about the axis of rotation of the nut so that one of the pair has an angular displacement of approximately 90° from the other of the pair. Articulation slots 21 are used to provide for compliance of the lead screw nut to variations in the straightness of the lead screw. The 90° angular displacement permits articulation in all directions. In this manner, the preloading of the lead screw nut is kept constant over the full length of the lead screw.

An additional feature of the present invention can be seen in FIG. 1. A nozzle 36 is connected by a tube 38 to a solenoid valve 40. The solenoid valve is also connected to an air-operated spindle actuator 42, and a compressed air source, not shown. The air-operated spindle actuator 42 is responsive to air pressure supplied from the compressed air source to permit the engraving tool 10 to be raised and lowered with respect to the work piece. The solenoid valve 40 is responsive to electrical signals from the control portion of the system to connect the actuator to the compressed air source, thereby supplying air pressure to the actuator, or to disconnect the actuator from the compressed air source, thereby removing air pressure from the actuator In FIG. 2, moveable bracket 44 can be seen which couples the spindle actuator 42 to the engraving tool 10.

The actuator includes an air-pressure port 46, a body 48, a threaded end 50, and a moveable shaft 52 which moves vertically in response to air pressure applied at port 46. The actuator body 48 is mounted to the carriage 20 using mounting bracket 54. The threaded end 50 is positioned against moveable bracket 44 so that spindle 52 protrudes through bracket 44. Bracket 44 is moveable with respect to mounting bracket 54 in a vertical direction. The end of shaft 52 which protrudes through bracket 44 is terminated with a nut 55. An adjusting nut 56 is positioned on the threaded end 50 above the bracket 44 and a spring 58 is positioned between the adjusting nut 56 and the bracket 44.

When air pressure is removed from the actuator, shaft 52 is caused to assume a raised position. Nut 55 is positioned on shaft 52 so that when shaft 52 is raised the nut comes into contact with bracket 44 so that bracket 44 is also raised. This, in turn, causes the engraving tool 10 to be raised with respect to the work piece.

The actuator includes an internal spring configuration such that, in the absence of air pressure at port 46, the internal spring (not shown) causes the shaft 52 to assume a raised position. When air pressure is applied at port 46, the internal spring force is counteracted, and when the internal spring force is fully counteracted, the shaft 52 assumes a fully-lowered position. The rate at which air enters the port 46, hence the rate at which the air pressure increases to counteract the internal spring pressure, determines the rate at which the shaft 52 is lowered. A needle valve 41 is included in valve 40 which permits adjustment of the air flow rate into the port 46 for regulation of the rate at which the shaft 52, hence the tool 10, is lowered.

When air pressure is applied to the actuator, the shaft 52 is caused to assume a lowered position. This, in turn, permits the engraving tool 10 to be lowered to the work piece surface. In the lowered position, nut 55 on shaft 52 is positioned to be out of contact with bracket 44. In this condition, the tension of spring 58 determines the amount of pressure with which the engraving tool 10 is maintained in contact with the work piece. Adjusting nut 56 can be adjusted so that the applied spring pressure of spring 58 can be increased or decreased.

When air pressure is removed from the actuator 42, the air contained within the body 48 is exhausted, by the action of the spring internal to the actuator, through port 46, via tube 62 to valve 40. This exhaust air is then caused to enter tube 38 and to exit through nozzle 36. Recall that when air pressure is removed from actuator 42, the engraving tool 10 is raised off of the work piece. It can therefore be seen that when the engraving tool 10 is raised off of the work piece, exhaust air from actuator 42 is circulated through nozzle 36. Nozzle 36 is positioned to direct a stream of air onto the work piece at the point from which the engraving tool was just raised, to clear any debris from the area.

A further feature of the present invention is a precision table clamp as can be seen in FIGS. 1, 4 and 5. The clamp includes a notched platform 62 which is positioned to slide upon the table 12. Adjusting screws 61 are positioned at the lower end of the table and in contact with the notched platform 62 to permit the platform 62 to be moved back and forth along the table 12 in minute increments. Retaining springs 63 are provided to maintain the platform in contact with the adjusting screws 61. These retaining springs are located beneath the table 12 and are coupled to the platform through access holes 65 cut in the table 12, FIGS. 5 and 6. The platform includes notches 64 which are positioned along the platform at predetermined intervals. The spacing between the notches at the top of the table, which is closest to the carriage lead screw 16, is smaller than for the notches which are positioned toward the lower end of the work piece. This notch spacing in combination with screws 61, permit a wide variety of different sized materials to be clamped onto table 12, without the need of a gross repositioning of the clamp whenever a workpiece dimension is changed.

A rubber strip 66 which is accommodated by the notches 64 is provided to form one end of the clamp in the platform 62. The top end 67 of the table 12 serves as the other end of the clamp. As can be seen from FIG. 5, the work piece is placed between the rubber strip 66 and the top end 67 of the table 12, and the screws 61 are tightened so that the work piece is firmly lodged between the rubber strip 66 and the top of the table 12. If a larger or smaller workpiece is to be processed, only the rubber stip needs to be moved, and only slight adjustment of the adjusting screws will be necessary to secure the workpiece into place.

As can also be seen from FIG. 5, the notches 64 are cut at an angle which opens towards the top of the table. In this manner, the rubber strip 66 is angled toward the top of the table to provide increased staying power of the rubber strip 66 within the particular notch, even under high clamping pressure. Other materials satisfactory for use in strip 66 include plastics and other semi-flexible synthetics.

By moving the position of the rubber strip 66, rather than changing the position of the screws 61, a wide variety of differently dimensioned work pieces may be clamped with relative ease.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

What is claimed is:

1. A mechanical tool manipulating apparatus of the type used in computer controlled tool manipulating systems wherein a tool is manipulated with respect to a workpiece which is supported by a table, comprising:
   first positioning means for positioning the tool along a first axis;
   second positioning means for positioning the table along a second axis, the first axis being orthogonal to the second axis so that the workpiece is operated upon by controlling the position of the tool along the first axis and the position of the table along the second axis; and
   means for providing lineal tracking of the tool and table including
      a plurality of slides having cylindrical cross-sections positioned parallel to the axis of each positioning means;
      a plurality of "v" wheels which are coupled to the tool and to the table, each "v" wheel positioned to roll along a corresponding slide; and
      means for elastically preloading the "v" wheels against the slides;
   wherein the tool is coupled to the first positioning means by a support structure, and a plurality of "v" wheels are mounted to the support structure, and further wherein the preloading means comprise a plurality of fingers of material upon each of which is mounted a "v" wheel, each finger being formed in the support structure and the table by cutting a kerf therein.

2. The mechanical tool manipulating apparatus, as recited in claim 1, wherein the first positioning means comprise
   a first lead screw;
   first driver means for rotating the first lead screw; and
   a first preloaded lead screw nut which is rotatably mounted to the first lead screw and coupled to the tool so that the rotation of the first lead screw urges the tool to travel parallel to the first lead screw axis with insignificant backlash.

3. The mechanical tool manipulating apparatus, as recited in claim 1, wherein the second positioning means comprise
   a second lead screw;
   second driver means for rotating the second lead screw; and
   a second preloaded lead screw nut which is rotatably mounted to the second lead screw and coupled to the table so that the rotation of the second lead screw urges the table to travel parallel to the axis of the second lead screw with insignificant backlash.

4. A mechanical tool manipulating apparatus of the type used in computer controlled tool manipulating systems wherein a tool is manipulated with respect to a workpiece which is supported by a table, comprising
   first positioning means for positioning the tool along a first axis;
   second positioning means for positioning the table along a second axis, the first axis being orthogonal to the second axis so that the work piece is operated upon by controlling the position of the tool along the first axis and the position of the table along the second axis; and
   means for providing lineal tracking of the tool and table;
   air pressure activated means for vertical positioning of the tool with respect to the workpiece, comprising
      a double-acting air cylinder responsive to the supplied air pressure having a shaft which is lowered when air pressure is applied and raised when air pressure is removed;
      means for moveably coupling the tool to the air cylinder shaft so that the tool is raised from the workpiece when the shaft is raised including means for decoupling the tool from the shaft when the shaft is lowered;
      means attached to the air cylinder and positioned to contact the tool coupling means for determining the contact pressure between the tool and the work piece when the air cylinder shaft is decoupled from the tool; and
      valve means for regulating the rate at which the air pressure is supplied to the air cylinder so that the rate at which the tool is lowered to the workpiece can be regulated.

5. The mechanical tool manipulating apparatus, as recited in claim 4, wherein the air pressure activated means exhausts air when air pressure is removed from the air cylinder and the tool is raised off of the work piece, and further including an exhaust tube for accepting the exhaust air and for directing the exhaust air onto the work piece, so that the debris which result from the operation of the tool upon the workpiece are cleared from the work piece.

6. The mechanical tool manipulating apparatus, as recited in claim 4, wherein the table has an edge piece extending above the table surface and which is positioned along one edge of the table, further including
   platform means for supporting the workpiece for movement with the table, including clamping surface means which are incrementally positionable on the platform means with respect to the table edge piece, the platform means being positionable along the surface table; and means for positioning the platform means with respect to the table edge piece so that the workpiece is fixed in position between the clamping surface means and the table edge piece for movement with the table.

7. The mechanical tool manipulating apparatus, as recited in claim 6, wherein the platform includes a plurality of grooves positioned to be parallel to the table edge piece and further wherein the clamping surface means is a rubber strip which is shaped for positioning within the grooves, a portion of the strip protruding above the platform surface along the length of the groove, to provide a clamping surface.

8. The mechanical tool manipulating apparatus, as recited in claim 7, wherein the grooves are formed to be angled in the direction of the table edge piece with an angle of several degrees to enhance retention of the clamping surface means within the groove when the workpiece has been clamped into position.

9. A mechanical tool manipulating apparatus of the type used in computer controlled tool manipulating systems wherein a tool is manipulated with respect to a workpiece which is supported by a table, comprising
first positioning means for positioning the tool along a first axis including
a first lead screw;
first driver means for rotating the first lead screw; and
a first preloaded lead screw nut which is rotatably mounted to the first lead screw and coupled to the tool so that the rotation of the first lead screw urges the tool to travel parallel to the first lead screw axis with insignificant backlash; and
second positioning means for positioning the table along a second axis, the first axis being orthogonal to the second axis so that the work piece is operated upon by controlling the position of the tool along the first axis and the position of the table along the second axis including
a second lead screw;
second driver means for rotating the second lead screw; and
a second preloaded lead screw nut which is rotatably mounted to the second lead screw and coupled to the table so that the rotation of the second lead screw urges the table to travel parallel to the axis of the second lead screw with insignificant backlash;
means for providing lineal tracking of the tool and table;
wherein the first and second preloaded lead screw nuts each comprise
an elongated nut body having a preloading slot and a pair of articulation slots, each slot lying in separate hypothetical planes which are orthogonal to the axis of rotation of the nut, the preloading slot being located adjacent one end of the nut and the pair of articulation slots being located adjacent the opposite end of the nut, each of the pair of articulation slots being positioned about the axis of rotation of the nut so that one of the pair has an annular displacement of approximately 90° from the other of the pair of articulation slots; and
adjusting means for compressing the nut body across the preloading slot.

10. The mechanical tool manipulating apparatus as recited in claim 9 wherein the adjusting means is a screw which is positioned parallel to the axis of rotation of the nut and across the first slot so that the nut body is compressed across the first slot when the screw is screwed into the nut body.

11. A mechanical tool manipulating apparatus of the type used in computer controlled tool manipulating systems, wherein in response to control signals, a tool is manipulated with respect to a workpiece which is supported by a table, comprising
first positioning means for positioning the tool along a first axis including
a first lead screw positioned along the first axis;
a first stepper motor which is responsive to the control signals for rotating the first lead screw;
a first preloaded lead screw nut which is coupled to the tool and rotatably mounted upon the first lead screw so that the tool is moved along the first axis, with insignificant backlash, whenever the first lead screw is rotated; and
first means for lineal tracking of the tool as it moves along the first axis;
second positioning means for positioning the table along a second axis, which is orthogonal to the first axis, including
a second lead screw positioned along the second axis;
a second stepper motor which is responsive to the control signals for rotating the second lead screw;
a second preloaded lead screw nut which is coupled to the table and rotatably mounted upon the second lead screw so that the table is moved along the second axis, with insignificant backlash, whenever the second lead screw is rotated; and
second means for lineal tracking of the table as it moves along the second axis;
means for air-activated control of tool position in a vertical plane with respect to the workpiece; and
means for recirculating exhaust air from the air-activated control means so that debris are automatically cleared from the work area of the workpiece whenever the tool is raised from the work piece.

12. The mechanical tool manipulating apparatus, as recited in claim 11, wherein the table has an edge piece extending above the table surface and which is positioned along one edge of the table, further including
platform means having a surface means which are incrementally positionable with respect to the table edge piece, the platform means being positionable along the surface table; and
means for positioning the platform means with respect to the table edge piece so that the workpiece is clamped between the clamping surface means and the table edge piece.

13. The mechanical tool manipulating apparatus, as recited in claim 12, wherein the platform includes a plurality of grooves positioned to be parallel to the table edge piece and further wherein the clamping surface means is a rubber strip which is shaped for positioning within the grooves, a portion of the strip protruding above the platform surface along the length of the groove, to provide a clamping surface.

14. The mechanical tool manipulating apparatus, as recited in claim 13, wherein the grooves are formed to be angled in the direction of the table edge piece with an angle of several degrees to enhance retention of the clamping surface means within the groove when the workpiece has been clamped into position.

* * * * *